Inventor:
Kurt E. Löhner

United States Patent Office 3,283,750
Patented Nov. 8, 1966

3,283,750
ROTARY PISTON DIESEL ENGINE
Kurt E. Löhner, Braunschweig, Germany, assignor to Beteiligungs- und Patentverwaltungsgesellschaft mit beschränkter Haftung, Essen, Germany
Filed Aug. 16, 1963, Ser. No. 302,650
Claims priority, application Germany, Aug. 25, 1962, B 68,565
7 Claims. (Cl. 123—8)

The present invention relates to a rotary piston diesel engine with an antechamber in the housing for receiving and releasing fuel, and with a recess in the rotor which, together with adjacent portions of the housing, forms a combustion chamber having a portion thereof located opposite a connection with the antechamber when the rotor occupies its position corresponding to the establishment of the maximum compression.

With engines of this type it is rather difficult, in the combustion chamber so to distribute the fuel mixture jet leaving the antechamber that a favorable course of the combustion will be obtained in spite of the longitudinal extension of the combustion chamber and a relative speed of certain wall portions of the combustion chamber relative to each other, and in spite of the fact that the fluid flow conditions differ considerably from those prevailing with piston stroke engines.

It is, therefore, an object of the present invention to provide a rotary piston diesel engine which will overcome the above-mentioned drawbacks.

It is another object of this invention to provide a rotary piston diesel engine which will assure a good distribution of the fuel mixture over the combustion chamber.

Another object of the present invention consists in the provision of a rotary piston diesel engine of the above-mentioned general type, in which the discharge period of the fuel mixture jet from the bore will be considerably reduced, or the quantity of fuel mixture discharged per time unit will be considerably increased.

It is still another object of this invention to provide a rotary piston diesel engine as set forth in the preceding paragraph which will greatly improve the course of combustion of the fuel in the combustion chamber.

These and other objects and advantages of the invention will appear more clearly from the following specification in connection with the accompanying drawings in which.

Figure 1:
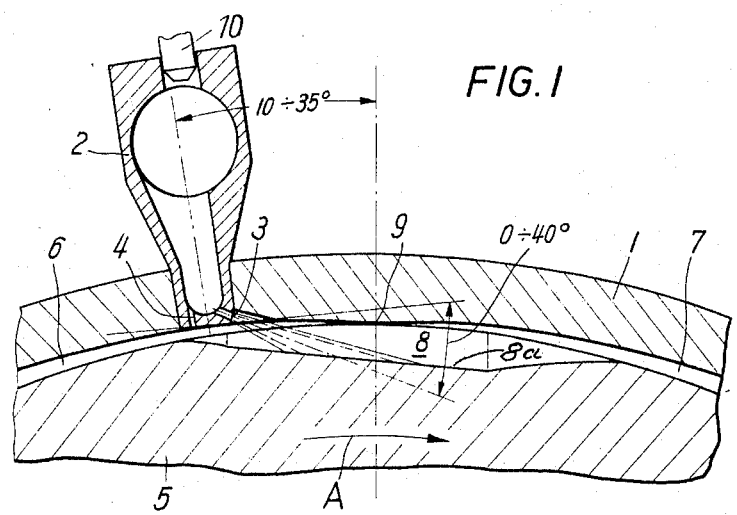
FIG. 1 illustrates in section a portion of the housing and rotor of a rotary piston diesel engine of the type set forth above.

The present invention is characterized primarily in that the antechamber is connected with the interior of the housing through a bore which leads from the antechamber into the interior of the housing in such a way that the maximum angle confined by the axis of said bore and the tangent to the inner contour surface within the range of the mouth of said bore is 40°, the arrangement being such that the mouth of said bore is located opposite a portion of a recess in the peripheral portion of the rotor—said recess forming the combustion chamber—when the rotor occupies its position corresponding to a maximum compression. Inasmuch as during the discharge period of the fuel mixture jet, the rotor rotates below the said bore, the above arrangement will assure a good distribution of the fuel mixture over the combustion chamber. The approximately or nearly tangential location of the discharge portion of the bore results in a soft discharge of the fuel mixture jet and in a high degree of penetration.

Referring now to the drawing in detail, the portion of the rotary piston diesel engine illustrated therein comprises a housing 1 with an antechamber 2 for receiving and discharging a fluid fuel injected through an injection nozzle 10. The antechamber 2 communicates with the interior of the housing 1 through a main bore 3. In order to obtain improved gas changes or gas breathing characteristics in the antechamber and not to have to rely exclusively on the tangential discharge of the fuel mixture jet from the bore, the antechamber 2 is, in conformity with the present invention, additionally connected to the inner chamber of the housing 1 through an auxiliary bore 4 which is normal or substantially normal to the inner wall of the housing 1.

As will be evident from the drawing, bore 3 leads into the interior of the housing 1 at an angle of less than 40°. In the particular showing illustrated by way of example in the drawing, it is assumed that the rotor 5 in the interior of housing 1 rotates in the direction of the arrow A. In the particular position shown in the drawing, rotor 5 occupies a position in which, in cooperation with the housing 1, it effects a maximum compression, which means that the total of the voluminae of the chambers 6 and 7 in this position, is smallest. Rotor 5 is provided with a recess 8 which, in cooperation with the respective adjacent inner contour surface of housing 1, confines the combustion chamber. In the particular position shown in the drawing, recess 8 is so located that a portion thereof is located opposite the mouth of bore 3.

It should be noted that not only is the position and design of the mouth of the bore 3, or, generally speaking, the connection of the antechamber with the interior of the housing 1, of importance for the combustion, but that also a corresponding design of the recess in the rotor may considerably contribute to the desired improvement in the course of the combustion. Therefore, in conformity with the present invention, the bottom of recess 8 is so designed that at least the major portion of its length will be impacted upon the air fuel mixture jet during the discharge period of the fuel mixture jet from the bore 3. The bottom of said recess 8 is so designed that the extension of the bottom 8a will intersect a tangent drawn in the range of the antechamber connection to the inner contour of the housing, and, more specifically, this intersection will be located at a point which, when looking in the direction of rotation of the rotor, will be located ahead of the mouth of bore 3. This will assure that all particles of the fuel mixture jet will, throughout the fuel discharge period, impact upon the bottom 8a of recess 8 at an acute angle, which means in a rather soft way. A hard reflection and corresponding reduction of the force of penetration of the jet in the direction of rotation of the rotor, will thus be avoided.

Figure 3:
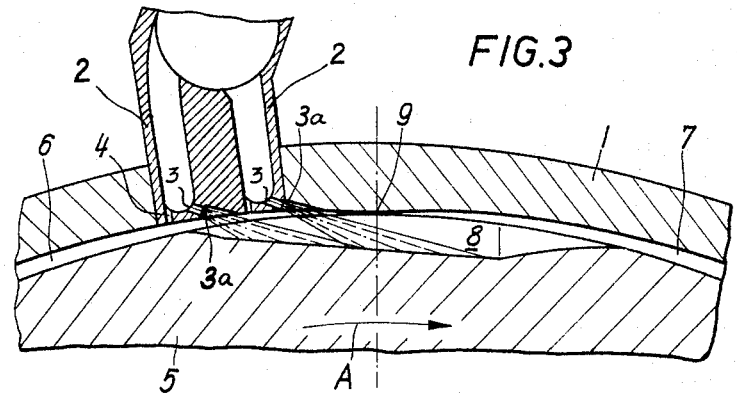
FIG. 3 is a section similar to FIG. 1 but shows a modification according to which two bores are arranged one behind the other when looking in the direction of rotation of the rotor and each provided with nozzle means directed in the direction of rotation of the rotor.

In order to shorten the fuel discharge period per time unit from bore 3 or, expressed differently, in order to increase the quantity of mixture discharged per time unit, according to the present invention and to FIG. 3 of the drawing there are provided a plurality of bores 3 which are located one behind the other when looking in the direction of rotation of rotor 1 and having their nozzle means 3a directed toward and in the longitudinal direction of the bottom 8a of recess 8.

For purposes of assuring a favorable course of combustion, it is furthermore suggested, according to the present invention, depending on the discharge direction of the fuel mixture jet in the direction of rotation of the rotor or opposite thereto, to arrange the mouth of the pair of bores 3 within a range of from 10 to 35° of the sector angle at the center, ahead of or behind the lobe formation 9 on the inner contour of the housing 1 within the range of the combustion chamber 8.

Figure 2:
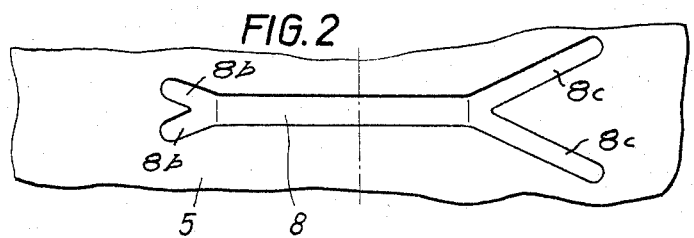
FIG. 2 is a top view of a combustion chamber recess shown in FIG. 1.

In addition thereto and according to FIG. 2, the fluid flow velocity in the recess 8 may furthermore be favorably influenced by providing at least one end portion of said recess 8 with a branch formation as, for instance, with converging and diverging branches 8b, 8c respectively as shown in FIG 2.

It is, of course, to be understood that the present invention is, by no means limited to the particular construction shown in the drawing, but also comprises any modifications within the scope of the appended claims.

What I claim is:

1. In a rotary piston diesel engine: a housing having an inner contour surface and having a rotor rotatably arranged within said inner contour surface of said housing and in one position relative to said housing confining with the latter a minimum space for compression to thereby effect a maximum compression of an air fuel mixture in said space, said rotor having a peripheral recess forming with portions of the inner contour surface of said housing a combustion chamber, and conduit means leading from said antechamber to the interior of said housing through the inner contour surface thereof, the mouth of said conduit means being located opposite a portion of said peripheral recess when said rotor occupies said one position, the maximum angle confined by the axis of said conduit means and the tangent to said inner contour surface within the range of said mouth being 40°, said peripheral recess having a bottom portion which is so inclined that when said piston is in said one position the extension of said bottom portion intersects a tangent to the housing inner contour surface within the range of the mouth of said conduit means at a point located behind said mouth when looking in the direction of rotation of said rotor, whereby in said one position of said piston at least the major portion of the length of said bottom portion is impacted upon by an air fuel mixture jet leaving said antechamber.

2. A rotary piston diesel engine according to claim 1, in which said conduit means includes a plurality of conduits arranged one behind the other when looking in the direction of rotation of said rotor, said conduits leading from said antechamber to the interior of said housing through the inner contour surface thereof and respectively having nozzle means located opposite a portion of said peripheral recess and all directed toward and in the longitudinal direction of said inclined bottom portion when said rotor occupies said one position.

3. A rotary piston diesel engine according to claim 1, in which the inner contour surface of said housing has a lobe formation located between the ends of said recess when said rotor occupies said one position, the mouth of said conduit means being located within a range of from 10 to 35° of the sector angle from said lobe formation.

4. An engine according to claim 1, which includes auxiliary conduit means leading from said antechamber into the interior of said housing and being at least approximately normal to said inner surface contour of said housing.

5. A rotary piston diesel engine according to claim 1, in which at least one of the end portions of said recess comprises a plurality of branches.

6. A rotary piston diesel engine according to claim 5, in which that end portion of the recess which first receives an air fuel mixture jet from said antechamber comprises branches converging in the direction toward the central portion of said recess.

7. A rotary piston diesel engine according to claim 5, in which that end portion of said recess which last receives an air fuel mixture jet from said antechamber comprises branches converging in the direction toward the central position of said recess.

References Cited by the Examiner

UNITED STATES PATENTS 3,053,238    9/1962    Meurer.

FOREIGN PATENTS

| 1,287,176 | 1/1962 | France. |
| 1,299,966 | 6/1962 | France. |
| 1,320,639 | 1/1963 | France. |
| 918,651 | 2/1963 | Great Britain. |
| 477,249 | 1/1953 | Italy. |

CARLTON R. CROYLE, *Primary Examiner.*

SAMUEL LEVINE, *Examiner.*

F. T. SADLER, *Assistant Examiner.*